United States Patent Office 3,576,859
Patented Apr. 27, 1971

3,576,859
PROCESS OF PREPARING LYSINE
MONOHYDROCHLORIDE
Johannes E. Nelemans, Geleen, Netherlands, assignor to
Stamicarbon N.V., Heerlen, Netherlands
No Drawing. Filed Nov. 22, 1968, Ser. No. 778,327
Claims priority, application Netherlands, Nov. 22, 1967,
6715824
Int. Cl. C07c 99/06, 99/12, 101/24
U.S. Cl. 260—534                                    5 Claims

ABSTRACT OF THE DISCLOSURE

There is provided a process for preparing lysine monohydrochloride by hydrolysis of α-amino-ε-caprolactam wherein the hydrolysis mixture is passed through an anion exchanger to remove HCl therefrom. The HCl bound to the anion exchanger is removed therefrom by formation of a salt with additional α-amino-ε-caprolactam and the salt is then used in the hydrolysis step.

The present invention relates to an improvement in the process for the preparation of lysine monohydrochloride by hydrolyzing α-amino-ε-caprolactam in aqueous solution with more than 2 moles of hydrochloric acid per mole of α-amino-ε-caprolactam, and recovering lysine monohydrochloride from the resulting hydrolysis mixture.

In this process (see for example U.S. Pat. No. 2,876,218 which disclosure is incorporated herein by reference) lysine dihydrochloride is first isolated by subjecting the hydrolysis mixture, which contains lysine dihydrochloride and hydrochloric acid, to a vacuum distillation, and subsequently the lysine dihydrochloride is converted to lysine monohydrochloride by means of pyridine in an alcoholic medium. The recovery of the alcohol and pyridine used as well as the hydrochloric acid split from the lysine dihydrochloride requires a number of costly operations. The details of this process and the separation of the resulting components are fully set forth in the above noted patent and will not be repeated herein. However, this process suffers from the decided disadvantage that the separation steps, noted above, are expensive and time consuming and the process, therefore, is hardly usable for the industrial-scale preparation of lysine monohydrochloride from α-amino-ε-caprolactam.

It is known (see for example U.S. Pat. No. 2,579,283 which disclosure is incorporated herein by reference) that lysine dihydrochloride can be converted into lysine monohydrochloride by passing an aqueous solution of lysine dihydrochloride over an anion exchanger. Upon regeneration of the anion exchanger, a chloride solution is obtained in this case. However, this process is not economical due to the inability thereof to recover processing reagents.

Accordingly, it is an object of the present invention to provide an improved process wherein lysine monohydrochloride may be prepared in a relatively pure form and wherein the process is simple to operate and economical. Other objects will be apparent from the following detailed disclosure and claims.

Briefly stated, it has now been found that in the hydrolysis of α-amino-ε-caprolactam by means of hydrochloric acid and with the use of a weak-base anion exchanger for the conversion of the lysine dihydrochloride formed in the hydrolysis products to lysine monohydrochloride, all or part of the hydrochloric acid bound to the anion exchanger in the process can be re-used in the hydrolysis step by forming a salt with the hydrochloric acid and additional α-amino-ε-caprolactam to be hydrolyzed. This salt formation can be suitably effected by passing an aqueous α-amino-ε-caprolactam solution over the anion exchanger to be regenerated, which results in the formation of α-amino-ε-caprolactam monohydrochloride. The monohydrochloride may then be hydrolyzed after the hydrochloric acid content of the solution has been raised, according to the above noted procedure. Alternately, the formation of the α-amino-ε-caprolactam monohydrochloride may be realized by regenerating the anion exchanger with ammonia water and then adding α-amino-ε-caprolactam to the eluate, which contains ammonium chloride, and removing in the gaseous state the ammonia released in the process. This removal may be carried out at any suitable temperature, e.g. 100° C. to 150° C.

The concentration of the α-amino-ε-caprolactam solution is not narrowly important, but aqueous solutions of 10 to 30 w./w. percent of the lactam are most convenient. Similarly, the concentration of the ammonia water is not narrowly important and 2 to 10 w./w. percent solutions are suitable. Also the temperature at which the lactam or ammonia solutions are contacted with the exchanger is not critical and from 15° C. to 40° C. is suitable.

Consequently, the invention provides a process of preparing lysine monohydrochloride by hydrolyzing α-amino-ε-caprolactam in aqueous solution with more than 2 moles of hydrochloric acid per mole of α-amino-ε-caprolactam at any convenient temperature, e.g. from 50° C. to 150° C. and recovering lysine monohydrochloride by removing the surplus of hydrochloric acid from the resulting hydrolysis mixture, this process being characterized in that hydrochloric acid, which is bound to lysine, is removed from the hydrolysis mixture by means of a weak-base anion exchanger, and at least part of the hydrochloric acid then bound to the anion exchanger is re-used in the hydrolysis step after forming a salt with the hydrochloric acid and α-amino-ε-caprolactam to be hydrolyzed. The particular conditions for the hydrolysis step as set forth in the above noted patent may be used if desired.

The process according to the invention is particularly suited for the preparation of L-lysine monohydrochloride from the corresponding aminolactam, because it has been found to involve no racemization.

That part of the hydrochloric acid in the hydrolysis mixture, which is not bound to the anion exchanger, can be removed in a known way from the hydrolysis mixture as a gas, e.g. by heating and distillation at temperatures between 95° C. and 120° C. before this hydrolysis mixture is passed over the anion exchanger. Preferably, the amount of hydrochloric acid which is removed from the hydrolysis mixture in the gaseous state, is sufficient so that the hydrolysis mixture to be passed over the anion exchanger will consequently contain at least some lysine monohydrochloride in addition to lysine dihydrochloride. In this case substantially all of the hydrochloric acid retained by the anion exchanger can be bound to an amount of α-amino-ε-caprolactam corresponding to the amount of lysine monohydrochloride prepared. The presence of an amount of 0.05–0.3 mole of lysine monohydrochloride per mole of lysine dihydrochloride in the hydrolysis mixture to be passed over the anion exchanger is sufficient to achieve this result.

The formation of the lysine monohydrochloride can be effected by passing over the anion exchanger the total amount of the aqueous solution concerned. The formation of the lysine monohydrochloride can also be carried out by passing part of the solution concerned over the anion exchanger to form an eluate containing free lysine, and subsequently mixing the eluate with the portion not passed over the ion exchanger. For carrying out the anion exchange, any suitable weak-base anion exchanger may be used e.g. those based on polystyrene with active groups of primary, secondary and tertiary amines or mixtures thereof.

Suitable anion exchangers are readily available on the market and are well known e.g. Dowex 3, Dowex 44, Amberlite IR–45, Amberlite IRA–93, IMAC A–20 and IMAC A–17 and are generally weak-base anion exchangers prepared from an amine or polyamine and a haloalkylated styrene-divinylbenzene copolymer. The aqueous solution containing lysine monohydrochloride which is obtained according to the invention can be converted, if so desired, into solid lysine monohydrochloride in any of the known ways, e.g. by spray-drying.

If so desired, the resulting aqueous solution containing lysine monohydrochloride can be subjected to a purification process, e.g. to a treatment with activated carbon.

Lysine monohydrochloride may be used for many known purposes, e.g. in foods and feeds.

The following examples elucidate the invention without restricting it.

EXAMPLE 1

128 g. of α-amino-ε-caprolactam, dissolved in 128 g. of water, is introduced into a flask equipped with a reflux cooler. To the solution in the flask there is added 146 g. of hydrochloric acid, dissolved in 341 g. of water. The mixture in the flask is then heated for 2 hours at boiling temperature, with reflux cooling. Nearly all of the α-amino-ε-caprolactam is thereby converted to lysine dihydrochloride.

The resulting aqueous solution, which contains lysine dihydrochloride and hydrochloric acid, is subjected to distillation at atmospheric pressure. During the distillation water is added to the solution in an amount that is about equal to the amount of water distilled off with the hydrochloric acid. After completion of the distillation, 80.5 g. of hydrochloric acid has been removed from the hydrolysis mixture, and a solution is obtained consisting of 175 g. of lysine dihydrochloride, 36 g. of lysine monohydrochloride, and 424 g. of water. After cooling, this solution is passed through a column having a dia. of 5 cm. and a height of 24 cm., filled with Dowex 3 anion exchanger, which is polystyrene cross-linked with 4% by weight divinylbenzene with active groups being primary, secondary and tertiary amines. After the solution has been passed over the anion exchanger, the latter is washed with water, and the resulting washing water is added to the eluate. At this stage 182.5 g. of lysine monohydrochloride dissolved in 805 g. of water is obtained.

Thereafter the anion exchanger is regenerated by passing a solution of 128 g. of α-amino-ε-caprolactam in 512 g. of water through the column and subsequently washing the column with water. Upon addition of the washing water to the regeneration eluate a solution is obtained which consists of 131.5 g. of α-amino-ε-caprolactam monohydrochloride, 25.5 g. of α-amino-ε-caprolactam, and 762 g. of water. After evaporation and addition of hydrochloric acid 182.5 g. of lysine monohydrochloride can be obtained from this solution in the way described above.

EXAMPLE 2

In the same way as described in Example 1, a solution consisting of 175 g. of lysine dihydrochloride, 36 g. of lysine monohydrochloride, and 424 g. of water is prepared from 128 g. of α-amino-ε-caprolactam. Thereafter the solution is passed through a column having a dia. of 5 cm. and a height of 27 cm., filled with IMAC A–17 anion exchanger, which is a polyamine type exchanger having secondary and tertiary amines as active groups. The column is washed with water and the washing water is added to the eluate. There results an aqueous solution of 182.5 g. of lysine monohydrochloride.

The anion exchanger is regenerated with a solution of 30 g. of ammonia in 270 g. of water, and subsequently washed with water. The washing water is added to the regeneration eluate. The result is a solution consisting of 42.8 g. of ammonium chloride, 16.4 g. of ammonia, and 510 g. of water. To this solution there is added 128 g. of α-amino-ε-caprolactam dissolved in 117 g. of water. The ammonia is removed from the resulting mixture by evaporation, after which a solution remains which consists of 25.5 g. of α-amino-ε-caprolactam, 131.5 g. of α-amino-ε-caprolactam monohydrochloride, and 120 g. of water, from which 182.5 g. of lysine monohydrochloride can be obtained.

EXAMPLE 3

A solution of 220 g. of L-lysine dihydrochloride and 7.3 g. of hydrochloric acid in 335 g. of water, obtained by hydrolyis of 128 g. of L-α-amino-ε-caprolactam with hydrochloric acid, is divided into two portions. The first portion, consisting of 147 g. of L-lysine dihydrochloride, 4.9 g. of hydrochloric acid and 223 g. of water, is treated with Dowex 3 anion exchanger according to the procedure of Example 1, which results in the formation of a solution of 124 g. of L-lysine monohydrochloride in 223 g. of water. Subsequently, the anion exchanger is regenerated with 128 g. of L-α-amino-ε-caprolactam dissolved in 512 g. of water. The second portion, consisting of 73 g. of L-lysine dihydrochloride, 2.4 g. of hydrochloric acid and 112 g. of water, is treated with Dowex 3 anion exchanger, which results in the formation of a solution of 58.5 g. of L-lysine-monohydrochloride in 112 g. of water. In this case the regeneration of the anion exchanger is effected with ammonia water.

The total amount of L-lysine monohydrochloride thus obtained is 182.5 g., and the regeneration with L-α-amino-ε-caprolactam yields 27.5 g. of hydrochloric acid for renewed use in the hydrolysis.

What is claimed is:

1. In a process for preparing lysine monohydrochloride by hydrolysis of α-amino-ε-caprolactam with more than 2 moles of hydrochloric acid per mole of α-amino-ε-caprolactam, and recovering lysine monohydrochloride by removing the surplus of hydrochloric acid from the resulting hydrolysis mixture, the improvement comprising removing at least a part of the hydrochloric acid bound to the lysine in the hydrolysis mixture by contacting the mixture with a weak-base anion exchanger, removing at least part of the hydrochloric acid which is thereby bound to the anion exchanger, forming a salt with the so removed hydrochloric acid and additional α-amino-ε-caprolactam to be hydrolyzed, and using the so formed salt in the hydrolysis step of the process.

2. Process according to claim 1 wherein the hydrolysis mixture which is contacted with the anion exchanger contains lysine monohydrochloride and lysine dihydrochloride.

3. Process according to claim 2 wherein the hydrolysis mixture which is contacted with the anion exchanger contains 0.05–0.3 mole of lysine monohydrochloride per mole of lysine dihydrochloride.

4. Process according to claim 1 wherein the said salt formation is effected by regenerating the anion exchanger with an aqueous solution of α-amino-ε-caprolactam which is to be subsequently hydrolyzed.

5. The process of claim 1 wherein the said salt formation is effected by regenerating the anion exchanger with ammonia water, adding additional α-amino-ε-caprolactam which is to be subsequently hydrolyzed to the resulting eluate and removing ammonia from the resulting mixture in the gaseous state.

References Cited
UNITED STATES PATENTS 2,579,283   12/1951   Vines et al. _____ 260—534L LORRAINE A. WEINBERGER, Primary Examiner J. L. DAVISON, Assistant Examiner